May 31, 1955  J. W. LEHDE  2,709,600
LOCK AND EJECTOR COLLETS
Filed May 28, 1954
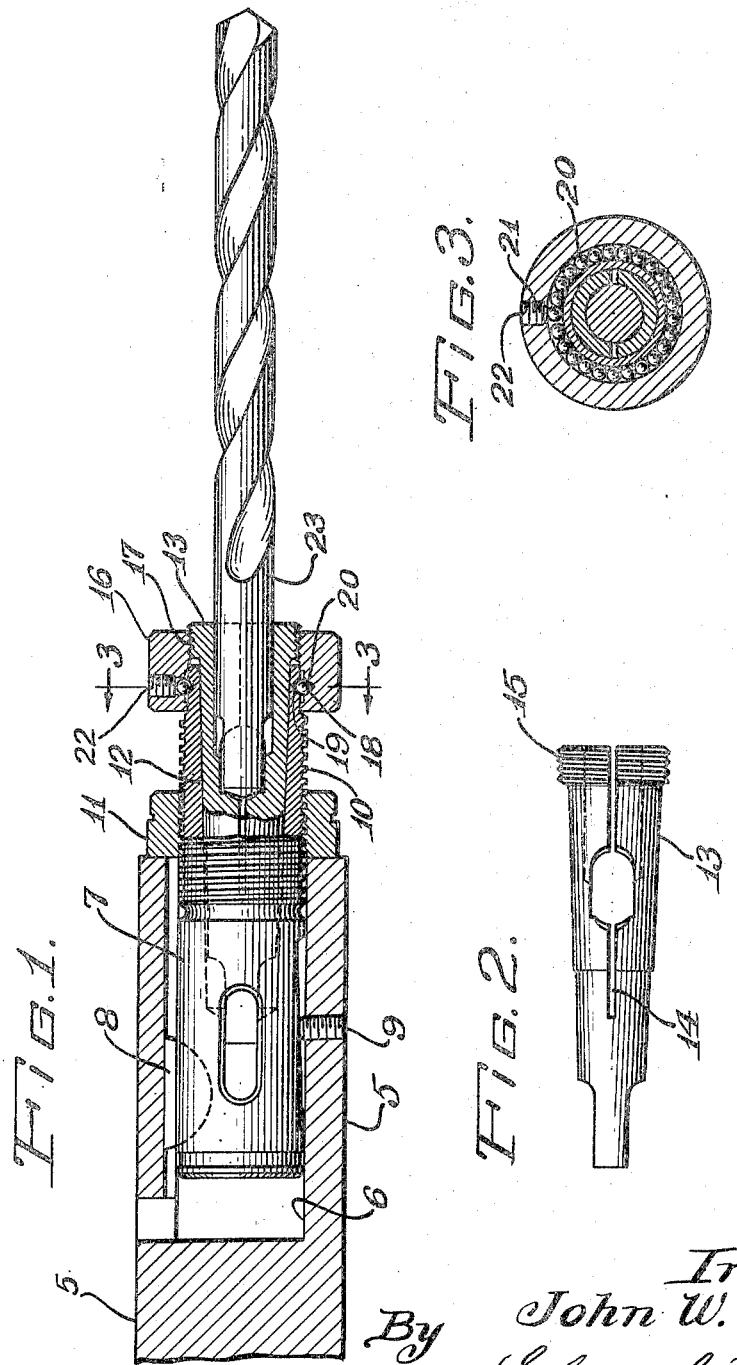
Inventor:
John W. Lehde
By Glenn E. Noble Atty.

2,709,600

LOCK AND EJECTOR COLLETS

John W. Lehde, Chicago, Ill., assignor to Scully-Jones & Company, Chicago, Ill., a corporation of Illinois Application May 28, 1954, Serial No. 433,057

2 Claims. (Cl. 279—52)

This invention relates to collet means for mounting tools such as drills or the like, in spindles or spindle adapters and is particularly directed to simplifying and improving the construction and operation of devices of this character. Heretofore it has been customary in using collets or holders with tapered shanks for driving the same and the collects would be removed by means of wedge and hammer, but such arrangements have been found particularly objectionable.

In accordance with the present invention, I provide means whereby the collet may be drawn into locking position by threaded means and may also be ejected by the same mechanism.

Other objects and advantages will be described more fully hereinafter in the following specification taken in connection with the accompanying drawings in which, Fig. 1 is a longitudinal sectional view of my improved lock and ejector collet shown in connection with the spindle and adapter.

Fig. 2 is a side view of the collet; and

Fig. 3 is a sectional view taken on the line 3—3 of Fig. 1.

As shown in these drawings, 5 represents any ordinary or preferred type of spindle as used in machine tools. It is provided at its end with a cylindrical recess 6 for receiving an adapter 7 which is held in adjusted positions by means of a key 8 and set screw 9 as shown. The adapter is threaded as shown at 10 for receiving a lock nut 11 which is used to fix the position of the adapter with respect to the spindle. The adapter is provided with a tapered hole 12 in its outer end for receiving the correspondingly tapered shank of the collet 13 which is preferably split as shown at 14 for ease in manipulating the same.

The outer end of the collet is preferably somewhat enlarged and provided with threads 15 as shown in Fig. 2. A nut 16 is provided with threads 17 for engagement with the threads 15. The nut has an annular groove 18 which is opposed to a groove 19 adjacent to the end of the adapter 7. A series of balls 20 is inserted in the grooves 18 and 19 as shown in Figs. 1 and 3 and serve to permit the rotation of the nut 16 and hold it in longitudinal position with respect to the adapter. These balls may be inserted through a threaded hole 21 and held in position by means of a set screw 22.

When a tool such as a drill 23 is to be fixed in operative position in the spindle, it is inserted in the collet as shown and the nut 16 is rotated to cause it to draw the collet into close engagement or locking fit with the tapered hole in the adapter. This causes the collet to be pressed against the drill and hold the drill securely in operative position. When it is desired to remove the drill, this may be readily done by turning the nut in the opposite direction which will force the collet out of the adapter and permit the removal of the drill.

From this description it will be seen that I provide an exceedingly simple and efficient means for mounting tools in spindles or the like and one which may be made at a minimum cost but will be particularly effective and long lasting in use. It will, of course, be apparent that the locking and ejecting means might be mounted directly in the spindle without the interposition of the adapter and other changes or modifications may be made without departing from the scope of the claims in which I claim:

1. Means for mounting drills or other tools in the spindles of machine tools, consisting of an adapter, means for adjustably mounting the adapter in the end of the spindle, said adapter having a tapered hole in the outer end thereof, a collet having a tapered portion adapted to fit in the tapered hole with a driving fit to actuate a tool, threads on the outer end of the collet, a nut having threads engaging with the threads on the collet, an annular series of balls between the nut and the adapter which serve as a ball bearing for the nut and also act as an annular key for holding the nut against longitudinal movement with respect to the adapter.

2. A collet chuck comprising a hollow cylindrical body with a tapered axial recess on one end thereof, a collet having a plurality of jaws and tapered to fit in said recess and having threads at the outer end thereof, a peripheral groove in the cylindrical body adjacent the end thereof, a nut engaging with the threads on the collet and having a non-threaded portion extending over the body, said non-threaded portion having an inner circumferential groove opposed to the groove in the body and balls in said grooves.

References Cited in the file of this patent

UNITED STATES PATENTS

| | | |
|---|---|---|
| 1,867,359 | Higby | July 12, 1932 |
| 2,374,725 | Blake | May 1, 1945 |